United States Patent [19]

Klautschek

[11] 3,965,409
[45] June 22, 1976

[54] D-C CONTROL ELEMENT CIRCUIT
[75] Inventor: Herwig Klautschek, Furth, Germany
[73] Assignee: Siemens Aktiengesellschaft, Munich, Germany
[22] Filed: Apr. 30, 1975
[21] Appl. No.: 572,892

[30] Foreign Application Priority Data
May 20, 1974 Germany............................ 2424369

[52] U.S. Cl. ........................... 321/45 C; 323/DIG. 1
[51] Int. Cl.² ........................................ H02M 7/155
[58] Field of Search ............. 307/252 M; 321/45 C; 323/DIG. 1

[56] References Cited
UNITED STATES PATENTS

| | | | |
|---|---|---|---|
| 3,321,697 | 5/1967 | Etter .................................. | 321/45 C |
| 3,538,419 | 11/1970 | Seki et al. ......................... | 321/45 C |
| 3,621,366 | 11/1971 | Duff et al. .......................... | 321/45 C |
| 3,652,874 | 3/1972 | Partridge ........................... | 307/252 M |

FOREIGN PATENTS OR APPLICATIONS
274,215  9/1970  U.S.S.R. ........................ 323/DIG. 1

*Primary Examiner*—William M. Shoop
*Attorney, Agent, or Firm*—Kenyon & Kenyon Reilly, Carr & Chapin

[57] ABSTRACT

In a d-c control circuit of a type comprising a controllable main valve, a commutation capacitor, a commutation choke and controllable commutation valve, a flyback valve arranged antiparallel to the main valve and a bypass valve, provision is made for connecting between the d-c voltage source and the main valve the primary winding of a transformer whose secondary winding, in series with a blocking diode, is connected parallel to the d-c voltage source. Additionally, provision is also made for connecting the commutation valve antiparallel to the bypass valve. With the d-c control circuit so configured, the load current can now flow in both directions.

8 Claims, 2 Drawing Figures

D-C CONTROL ELEMENT CIRCUIT

BACKGROUND OF THE INVENTION

1. Field of the Invention

The invention concerns a d-c control circuit of a type comprising: a controllable main valve which is arranged in one of the two connecting lines between a d-c voltage source and a load; a quenching branch for the main valve which includes a commutation capacitor, a commutation choke and a controllable commutation valve in series and which is connected parallel to the main valve in the blocking direction of the commutation valve; a flyback (or swing-back) valve connected antiparallel to the main valve; and a bypass valve which is arranged parallel to the load.

2. Description of the Prior Art

Such a d-c control circuit is known, for instance, from the German Pat. No. 1,242,289. It is used particularly for operating a d-c machine. In particular, when used in this manner the d-c control circuit only permits load current to flow in one of the two current directions. Therefore, operation is possible only in one of the four quadrants of a coordinate system which is formed by the voltage and the current of the load. In many applications, however, such as, for instance, for a propulsion drive with a d-c machine, current reversal and operation with the other current direction is desired. In particular, such other current direction is needed to provide the required braking operation to the propulsion drive system.

It is therefore an object of the present invention to provide a d-c control circuit which permits and can operate during a reversal of the current direction at the load. In other words, the d-c control circuit of the present invention is to be designed to provide two-quadrant operation.

SUMMARY OF THE INVENTION

In accordance with the principles of the present invention the above and other objectives are realized in a d-c control circuit of the above-mentioned type by providing that, between the d-c voltage source and the main valve of the d-c circuit, a primary winding of a transformer is disposed whose secondary winding, in series with a blocking diode, is connected parallel to the d-c voltage source, and further by providing that the connection of the commutation valve of the circuit and the commutation capacitor of the circuit be connected to one of the two connecting lines of the circuit in such a manner that the aforesaid commutation valve is antiparallel to the bypass valve of the circuit.

With the above configuration, the d-c control circuit of the present invention has a controllable valve disposed in one of the connecting lines between the d-c voltage source and the load as well as parallel to the load. Moreover, to each of these controllable valves, an uncontrolled valve is connected with reversed polarity. Thus, the load current can now flow between the d-c voltage source and the load in both current directions. In particular, the one current-carrying controllable valve is extinguished as a result of the firing the other respective controllable valve. Such firing causes the commutation capacitor to reverse, via the two controllable valves, and, when swinging back, it extinguishes the then current-carrying controllable valve. During this commutation process, the full d-c voltage of the d-c voltage source is present at the primary winding of the transformer. The inductance of the main field of the latter prevents a steep rise of the current of the d-c current flowing from the d-c voltage source. After the commutation process is completed, the commutation capacitor is recharged to its original polarity. The secondary winding then prevents the voltage at the primary winding from becoming too high when the d-c current flowing from the d-c voltage source decreases.

It should be noted that the German Offenlegungsschrift No. 1,613,744 discloses the disposing of a sum quenching arrangement at the input of a converter and the connecting, between the d-c supply voltage source and the sum quenching arrangement, the primary winding of a transformer whose secondary winding, in series with a blocking diode, is disposed parallel to the d-c voltage source. The aforesaid transformer, however, is used as a component which aids the sum quenching and thus serves a different purpose than the transformer of the present invention.

One advantage of the present invention is that only a small number of additional components are employed. It should be emphasized, in particular, that no more than two controlled valves and a single commutation capacitor are required for two-quadrant operation.

BRIEF DESCRIPTION OF THE DRAWING

Examples of embodiments of the invention will be explained in detail in the following detailed description which makes reference to the accompanying drawing, in which.

DETAILED DESCRIPTION

Figure 1:
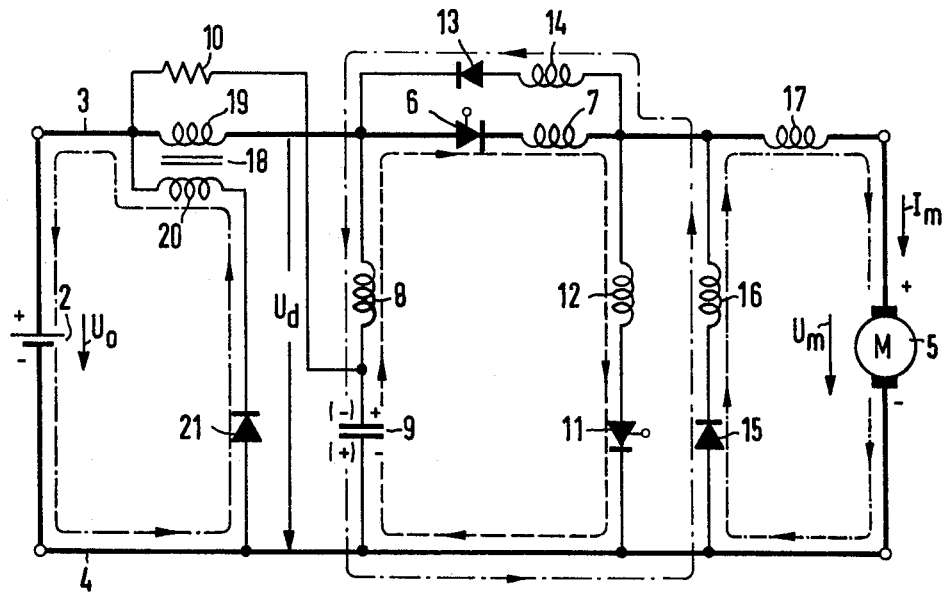
FIG. 1 shows a d-c control circuit for two-quadrant operation in accordance with the principles of the present invention.

As shown in FIG. 1, a d-c voltage source 2 with the d-c voltage $U_o$, e.g., an uncontrolled rectifier or a battery, is connected with a load 5 via a positive connecting line 3 and a negative connecting line 4 of a d-c control circuit in accordance with the invention. The load 5 is illustrated as a speed-controllable d-c machine of a vehicle and, in actual practice, may comprise a number of such machines.

In the positive connecting line 3, a controlled main valve 6, in particular, a thyristor, is disposed. The main valve 6 is connected to a limiting choke 7, the latter serving to limit the rise of the current in the main valve 6. If desired, the limiting choke 7 may be omitted.

Between the positive and the negative connecting lines 3 and 4, respectively, are connected a commutation choke 8 which is in series with a commutation capacitor 9. As shown, the commutation choke 8 is connected with the anode of the main valve 6. For recharging the commutation capacitor 9, a recharging branch is provided. This recharging branch comprises a high-resistance recharging resistor 10, which is arranged between the positive pole of the d-c voltage source 2, on the one hand, and the commutation capacitor 9, on the other hand. Thus, the series circuit comprising the commutation capacitor 9 and the recharging resistor 10 is arranged directly parallel to the d-c voltage source 2. In principle, the commutation capacitor 9 could also be recharged from another d-c voltage source.

The commutation choke 8 and the commutation capacitor 9 are components of a quenching branch for the main valve 6. Also included in this quenching branch is a controllable commutation valve 11 which, typically, might be a thyristor. The commutation valve 11 is connected between the positive and the negative connecting line 3 and 4, respectively in such a manner that the entire series circuit comprising elements 8, 9, 11 is connected parallel to the main valve 6 in the blocking direction of the commutation valve 11. As shown, the junction between the cathode of the commutation valve 11 and the one electrode of the commutation capacitor 9 is connected with the negative connecting line 4. Disposed in series with the valve 11 is a limiting choke 12 which serves to limit the rate of current rise in the valve 11. It should be noted that choke 12, if desired, may be omitted. In the present case, the cathode of the main valve 6 is connected with the anode of the commutation valve 11 via the two limiting chokes 7 and 12.

An uncontrolled flyback valve 13, to which a flyback choke 14 is advantageously connected in series, is disposed antiparallel to the series circuit comprising the main valve 6 and the limiting choke 7. Similarly, there is also disposed, antiparallel to the series circuit comprising the commutation valve 11 and the limiting choke 12, an uncontrolled bypass valve 15. Advantageously, a reversal choke 16 is connected in series with the bypass valve 15. The latter series connection of choke 16 and diode 15, in turn, is connected in series with a series circuit formed by a smoothing choke 17 and the load 5.

A transformer 18 is connected at the input of the d-c control circuit. In particular, the primary winding 19 of the transformer 18 is connected into the positive connecting line 3 between the positive pole of the d-c voltage source 2 and the anode of the main valve 6. The secondary winding 20 of the transformer, which has a substantially larger number of turns than the primary winding 19, is, in turn, connected in series with a blocking diode 21. The series circuit of winding 20 and diode 21 is disposed directly parallel to the d-c voltage source 2, with the anode of the blocking diode 21 connected to the negative connecting line 4 which may be grounded.

As shown in FIG. 1, the present d-c control circuit, generally speaking, is designed so that a controlled valve is always arranged in one of the two connecting lines 3 and 4 as well as, parallel to the load 5, and so that an uncontrolled valve with reversed polarity is connected parallel to each of these controlled valves. Thus, the load current $I_m$ can flow between the d-c voltage source 2 and the load 5 in both current directions. In the embodiment shown, one of the respective current-carrying valves 6 or 11 is extinguished by the firing of the other valve 11 or 6, respectively. The commutation capacitor 9 then becomes reversed in polarity, via the two valves 6 and 11, and, in swinging back to its original polarity extinguishes the then current-carrying valve 6 or 11. During this commutation process, the intermediate-link voltage $U_d$, which is present at the series circuit comprising the commutation choke 8 and the commutation capacitor 9, becomes zero. The d-c voltage $U_o$ is then connected directly to the primary winding 19. After the commutation process is completed, the commutation capacitor 9 is charged to its initial polarity. Because of the continued charging of the commutation capacitor 9 from the d-c voltage source 2, a current flows via the secondary winding 20. As a result, the voltage at the primary winding 19 does not assume an excessively high value when the charging current decreases. The aforesaid operation of the circuit will become clearer from the following detailed operational description.

The operation of the present d-c control circuit will be considered first for motor operation of the load 5. In motor operation, energy is delivered from the d-c voltage source 2 to the load 5, which is the case illustrated in FIG. 1.

Let it be assumed that the main valve 6 is fired. Then the load current $I_m$ flows along the path marked in FIG. 1 by the heavy line, namely, from the positive pole of the d-c voltage source 2 via the primary winding 19, the main valve 6, the limiting choke 7, the smoothing choke 17 and the load 5, back to the negative pole of the d-c voltage source 2. In this case, the commutation capacitor 9 is charged, via the recharging resistor 10, to the level of the d-c voltage $U_o$ with the polarity indicated.

If the d-c control circuit is now to be blocked, the commutation valve 11 is fired. This begins a reversal process, at the end of which the commutation capacitor 9 has reversed its charge to the level of the d-c voltage $U_o$ with the polarity shown in parentheses. The reversal path is shown dashed in FIG. 1. It leads from the upper electrode of the commutation capacitor 9 via the commutation choke 8, the main valve 11 to the lower electrode of the commutation capacitor 9.

This reversal process is immediately followed by a swing-back process. The swing-back path is shown in FIG. 1 by a dash-dotted line. It leads from the lower electrode of the commutation capacitor 9 via the bypass valve 15, the reversal choke 16, the flyback choke 14, the flyback valve 13 and the commutation choke 8 to the upper electrode of the commutation capacitor 9. The main valve 6 is thereby extinguished and, as a result, it recovers its dielectic strength. This swing-back process is completed after the current in the flyback valve 13 has become zero.

After the flyback process has ended, the commutation capacitor 9 is recharged with the original polarity via the path 2, 3, 19, 8, 9, 4 and 2. After the capacitor voltage has risen to a limit determined by the turns ratio, one obtains the state of the d-c control circuit depicted in FIG. 1 by the double dash-dotted lines. Accordingly, the load current $I_m$ is now commutated away from the main valve 6 to the bypass valve 15. In spite of a firing pulse which continues to be present at the commutation valve 11, this commutation valve 11 carries no current, as the smoothing choke 17 drives the load current $I_m$ through the bypass valve 15 in the direction shown. Furthermore, as shown, a current flows from the negative pole of the d-c voltage source 2 to the positive pole of the d-c voltage source 2 via the blocking diode 21 and the secondary winding 20. The charging current of the commutation capacitor 9 decreases during this process. As the secondary winding 20 carries current, the decrease of the charging current is determined essentially only by the stray reactances of the transformer 18. These are smaller than the main-field reactance, so that a rapid decrease of the charging current, but no appreciable overvoltage at the commutation capacitor 9 occurs.

The need to arrange the transformer 18 at the input of the present d-c control circuit can be readily appreciated from the above-described commutation operation. Since during such operation the intermediate-link voltage $U_d$ between the connection of the primary winding 19 and the main valve 6, on the one hand, and the negative connecting line 4, on the other hand, is short-circuited, a smoothing member of substantial inductivity must be connected between the positive pole of the d-c voltage source 2 and the main valve 6. A simple choke coil could not meet this requirement, since too high of a voltage spike would appear at such a choke when the input current coming from the d-c voltage source 2 decreases, which could destroy the valves 13 and 16 of the d-c control circuit. Through the use of the transformer 18 it is therefore assured that the d-c voltage $U_o$ is applied to the primary winding 19 during the commutation process. As a result, a voltage which drives the above-mentioned input current via the blocking diode 21 is induced in the secondary winding 20. After the current in the swingback valve 12 becomes zero, the intermediate-link voltage $U_d$ cannot, therefore, rise to arbitrarily high values. The intermediate-link voltage $U_d$ is thus limited by the ratio of the number of turns of the secondary winding 20 to the number of turns of the primary winding 19. This ratio is somewhat larger than 1 and can be, for instance, 3 to 6.

The transformer 18 need be designed only for a relatively small voltage-time area, which is calculated from the product of the d-c voltage $U_o$ and the commutation time. The size of the transformer 18 can, therefore, be smaller than the size of the smoothing choke 17.

If the d-c control circuit is to again be connected to the load, the main valve 6 is refired. This causes the load current $I_m$ to quickly go from the bypass valve 15 to the main valve 6, and the original condition is restored.

By alternatingly firing the two valves 6, 11, the energy can be fed to the load 5 from the d-c voltage sorce 2 in a controlled manner. The drive torque is controlled by the relationship of the firing points of the valves 6, 11.

The operation of the d-c control circuit for generator operation of the load 5 will now be considered. In this case reference will be made to FIG. 2 in which the current directions for generator operation are shown. During generator operation the energy is transmitted from the load 5 to the d-c voltage source 2. Generator operation occurs if the voltage $U_m$ at the load 5 is higher than the mean value of the voltage at the series circuit 11, 12.

Let it be assumed that the commutation valve 11 is conducting. The d-c control circuit is then blocked, and the load current flows along the path shown by the double dash-dotted line in FIG. 2, i.e., from the load 5 via the smoothing choke 17, the limiting choke 12 and the commutation valve 11 back to the load 5. Some time before, a decaying current had flowed from the negative pole of the d-c voltage source 2, via the blocking diode 21 and the secondary winding 20 to the positive pole of the d-c voltage source 2. This path is likewise shown in FIG. 2 by a double dash-dotted line. The commutation capacitor 9 is charged via the recharging resistor 10 with the polarity shown.

If the d-c control is to be connected through to the load 5, the main valve 6 is fired. A reversal process develops, during which the commutation capacitor 9 is charged in the reverse direction. The charge reversal takes place along the path shown by the dashed line from the upper electrode of the commutation capacitor 9 via the commutation choke 8, the main valve 6, the limiting choke 7, the limiting choke 12 and the commutation valve 11 to the lower electrode of the commutation capacitor 9. This reversal process is terminated as soon as the current flowing via the main valve 6 has become zero.

Figure 2:
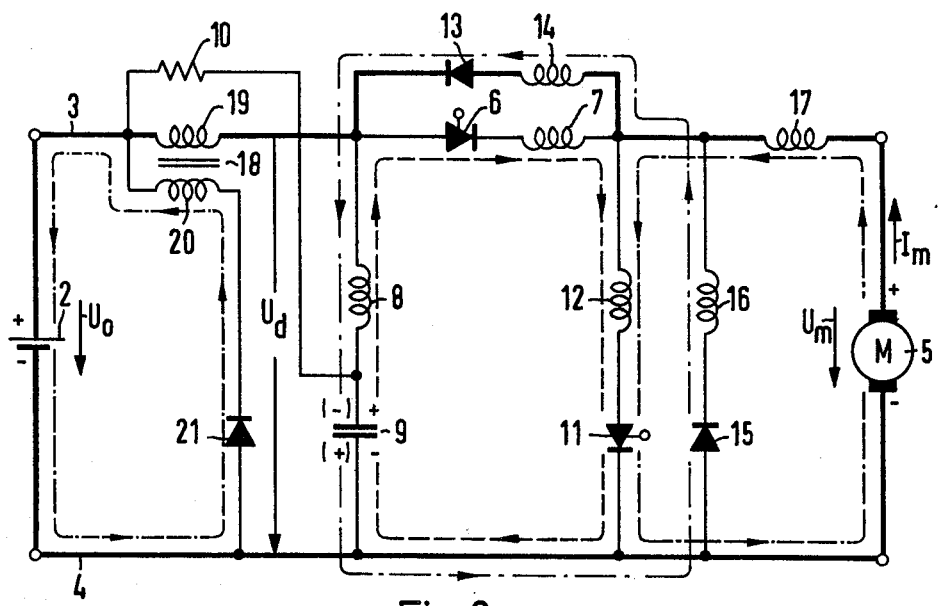
FIG. 2 illustrates the d-c control circuit of FIG. 1 with the load operated as a generator.

This is immediately followed by a flyback process, whose back-swing is shown dash-dotted in FIG. 2. This path leads from the lower electrode of the commutation capacitor 9 via the bypass valve 15, the reversal choke 16, the flyback choke 14, the flyback valve 13 and the commutation choke 8 to the upper electrode of the commutation capacitor 9. This flyback process is completed as soon as the current in the bypass valve 15 has become zero.

For the currents produced in the transformer 18, the same explanation applies as in the motor operation. After the end of the commutation process, a charging current flows from the load 5 along the path 17, 14, 13, 8, 9 4 back to the load 5. When the capacitor voltage exceeds the limit value, the blocking diode 21 becomes conducting. This makes the charging current go rapidly from the path mentioned to the path 5, 17, 14, 13, 19, 3, 2, 4, 5.

After the end of the flyback process, an operating state is obtained which is marked in FIG. 2 by heavy lines. Thus, the load current $I_m$ flows from the load 5 via the smoothing choke 17, the flyback choke 14, the flyback valve 13, the primary winding 19, the d-c voltage source 2 and the negative connecting line 4 back to the load 5.

If thereafter, the d-c control circuit is to be turned off again, the commutation valve 11 is refired. The load current $I_m$ is then transferred from the flyback valve 13 to the commutation valve 11. This reestablishes the original state.

By alternatingly firing the two valves 6, 11 the energy can be fed back from the load 5 into the d-c voltage source 2 in a controlled manner. If the load 5 is a d-c machine, the latter is braked in the process. The braking torque is set by the relationship of the firing points of the valves 6, 11.

What is claimed is:
1. A d-c control circuit for use with a d-c voltage source and a load comprising:
   first and second connecting lines adapted to connect said source to said load, said first connecting line including a controllable main valve;
   A quenching circuit branch for operating on said main valve including a commutation capacitor, a commutation choke and a controllable commutation valve connected in series, said quenching circuit being connected in parallel with said main valve such that said commutation valve is in the blocking direction of said main valve;
   a fly-back valve connected antiparallel to said main valve;
   a bypass valve adapted to be connected parallel to said load
   a transformer including a primary winding, a secondary winding and a blocking diode connected in series with said secondary winding, said series connection of said blocking diode and said secondary winding being adapted to be connected in parallel with said source and said primary winding being adapted to be connected between said main valve and said source;
   and said commutation valve and said commutation capacitor having a common connection connected to said second line such that said commutation valve is antiparallel to said bypass valve.

2. A d-c control circuit according to claim 1 which further includes a limiting choke connected in series with said commutation valve.

3. A d-c control circuit according to claim 1 in which said first line further includes a limiting choke connected in series with said main valve.

4. A d-c control circuit according to claim 1 which further includes a reversal choke connected in series with said bypass valve.

5. A d-c control circuit according to claim 1 which further includes a flyback choke connected in series with said flyback valve.

6. A d-c control circuit according to claim 1 which further includes a smoothing choke adapted to be connected in series with said load and in which said bypass valve is adapted to be connected in parallel with the series connection of said load and said smoothing choke.

7. A d-c control circuit according to claim 1 which further includes a recharging circuit branch for recharging said commutation capacitor.

8. A d-c control circuit according to claim 1 in which said recharging circuit branch includes a high resistance recharging resistance having one end connected with said commutation capacitor and another end adapted to be connected to said source.

* * * * *